(12) United States Patent
Tekara Perrotta

(10) Patent No.: US 11,232,108 B2
(45) Date of Patent: Jan. 25, 2022

(54) METHOD FOR MANAGING DATA FROM DIFFERENT SOURCES INTO A UNIFIED SEARCHABLE DATA STRUCTURE

(71) Applicant: Sedarius Tekara Perrotta, Stamford, CT (US)

(72) Inventor: Sedarius Tekara Perrotta, Stamford, CT (US)

( * ) Notice: Subject to any disclaimer, the term of this patent is extended or adjusted under 35 U.S.C. 154(b) by 358 days.

(21) Appl. No.: 15/642,191

(22) Filed: Jul. 5, 2017

(65) Prior Publication Data

US 2018/0011858 A1 Jan. 11, 2018

Related U.S. Application Data

(60) Provisional application No. 62/358,356, filed on Jul. 5, 2016.

(51) Int. Cl.
*G06F 16/00* (2019.01)
*G06F 16/2457* (2019.01)
*H04L 29/08* (2006.01)
*G06F 16/14* (2019.01)

(52) U.S. Cl.
CPC ........ *G06F 16/24578* (2019.01); *G06F 16/14* (2019.01); *H04L 67/306* (2013.01)

(58) Field of Classification Search
CPC ............... G06F 16/24578; G06F 16/14; G06F 17/3071; G06F 17/30864; G06F 17/30598; G06F 17/30705; G06F 17/30265; H04L 67/306
See application file for complete search history.

(56) References Cited

U.S. PATENT DOCUMENTS

| | | | |
|---|---|---|---|
| 2013/0046761 A1* | 2/2013 | Soderberg | G06Q 10/10 707/736 |
| 2016/0048537 A1* | 2/2016 | Epstein | G06F 16/5866 705/26.7 |
| 2016/0294761 A1* | 10/2016 | Hameed | H04L 67/306 |

* cited by examiner

*Primary Examiner* — Ashish Thomas
*Assistant Examiner* — Suman Rajaputra

(57) ABSTRACT

A method for managing data from different sources into a unified searchable data structure is an application to manage a data library to increase the accuracy and efficiency for retrieving information. The method is intended to be used by employees of individual organizations to find and reference commonly used websites, electronic files, documents, or templates within the organization. The end-user is able to import content from an external source. Metadata from the external source and that specific end-user's behavior influences a set of content tags associated with a content reference for the external source. The content reference is a pointer to the external source to allow the present invention to display the external source along with the set of content tags to the user who navigated or searched within the application.

4 Claims, 11 Drawing Sheets

METHOD FOR MANAGING DATA FROM DIFFERENT SOURCES INTO A UNIFIED SEARCHABLE DATA STRUCTURE

The current application claims a priority to the U.S. Provisional Patent application Ser. No. 62/358,356 filed on Jul. 5, 2016.

FIELD OF THE INVENTION

The present invention relates generally to a data retrieval application. More specifically, the present invention relates to an application that takes any type of information format from any source and applies a standardized data association to increase the ease of data retrieval.

BACKGROUND OF THE INVENTION

Presently, data consolidation methods are inefficient in terms of data retrieval processes. Currently, data retrieval processes do not differentiate metadata from the content that the metadata is associated with. Metadata is a set of data that describes and gives information about other data. This set of data is typically used to find content on the Internet; however, the metadata is usually user-defined or indiscriminately assigned to data. Indiscriminately assigning metadata leads to the irrelevant tagging for the content which presents content that is unrelated to the search terms input by the user.

The present invention is a method for managing data from different sources into a unified searchable data structure. The present invention is an application which creates a series of content tags for external content based on user interactions with the system, metatags of the external content, and the subject matter within the external content to generate relevant content tags to the external content. The relevant content tags allow a server cluster to find content more accurately and effectively in order to display the relevant external content to the user.

DETAIL DESCRIPTIONS OF THE INVENTION

All illustrations of the drawings are for the purpose of describing selected versions of the present invention and are not intended to limit the scope of the present invention.

The present invention is a method for managing data from different sources into a unified searchable data structure. The present invention is an application to manage a data library to increase the accuracy and efficiency for retrieving information. The present invention is intended to be used for individual organizations for employees to find and reference commonly used websites, electronic files, documents, or templates within the organization.

Figure 1:
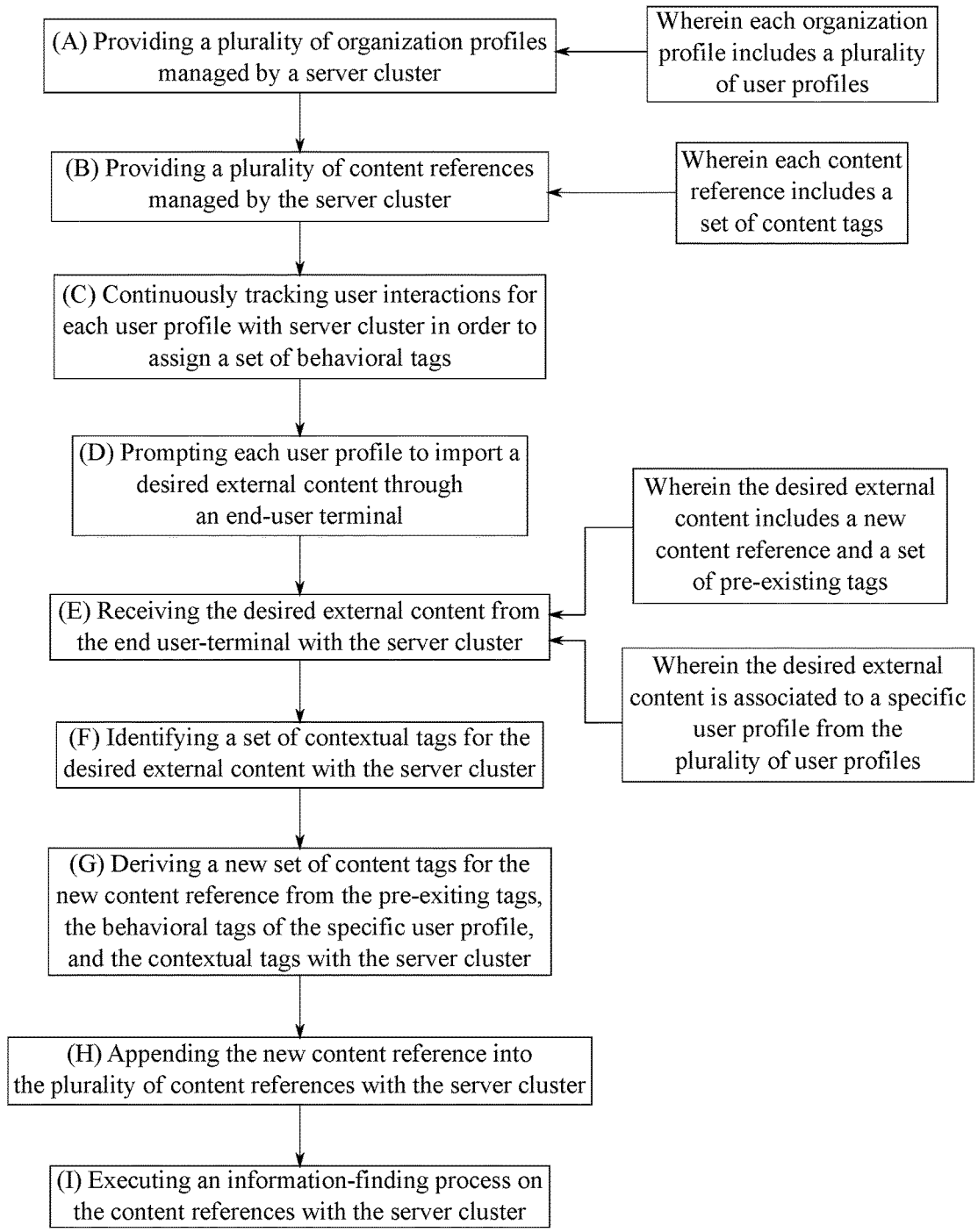
FIG. 1 is a general flow diagram for the present invention.

In order to execute the present invention, a plurality of organization profiles are managed by a server cluster, as shown in FIG. 1. The plurality of organization profiles is representative of different businesses or organizations within the system. Each organization profile includes a plurality of user profiles that represent specific end-users of the organization. Further, a plurality of content references is managed by the server cluster. Content references are hyperlinks or file paths to the websites, electronic files, documents, or templates. Each content reference includes a set of content tags in order to index the and find the content to present to the user.

In accordance to the preferred embodiment of the present invention, the first step of the present invention is continuously tracking user interactions for each user profile with the server cluster in order to assign a set of behavioral tags, detailed in FIG. 1. User interactions include: search functions, assigning the behavioral tags based on search terms; engaging hyperlinks, assigning behavioral tags based on the metatags of the hyperlink; interacting with other application elements, assigning behavioral tags based on the metatags of the application elements; or accessing content references, assigning the behavioral tags based on the tags of the content references. Behavioral tags represent what content the user has or is likely to interact with through the application.

Next, each user profile is prompted to import desired external content through an end-user terminal, further in accordance to FIG. 1. The external content is content that is not yet associated with any content references within the plurality of content references that the user desires to be more readily accessible. The end-user terminal is a personal computer, laptop, smartphone, tablet, or similar device use by the user to access the present invention.

The desired external content is then received from the end-user terminal with the server cluster, in order to store a new content reference on the server cluster. The desired external content includes the new content reference, to locate the content at a later time, and a set of pre-existing tags to provide a basis for additional metadata for the desired external content. The desired external content is also associated to a specific user from the plurality of user profiles accessing the end-user terminal. From the desired external content, a set of contextual tags for the desired external content is identified with the server cluster by examining the subject matter of the desired external content. A new set of content tags for the new content reference is then derived from the pre-existing, the behavioral tags of the specific user profile, and the contextual tags with the server cluster and, therefore, updating the tags from the desired external content to be more accurate and relevant to the subject matter of the desired external content. The new context reference is then appended into the plurality of content references with the central server. An information-finding process is then executed on the content references with the server cluster, allowing the server cluster to index the updated tags and retrieve the desired content for the user. The information-finding process is the navigation or search performed by the user to access the desired content.

Figure 2:
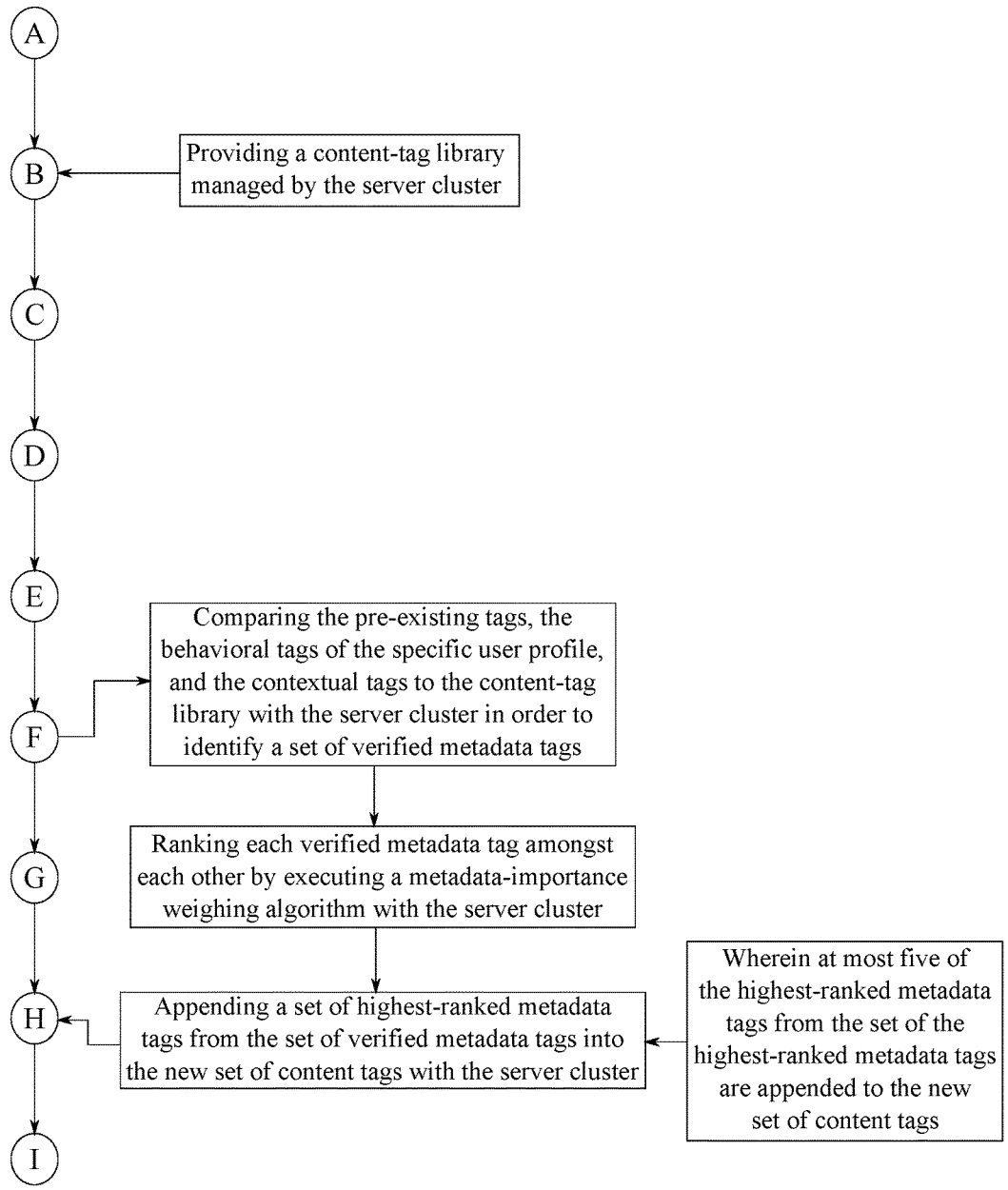
FIG. 2 is flow diagram detailing the generation of metadata tags to append with the new set of content tags.
Figure 4:
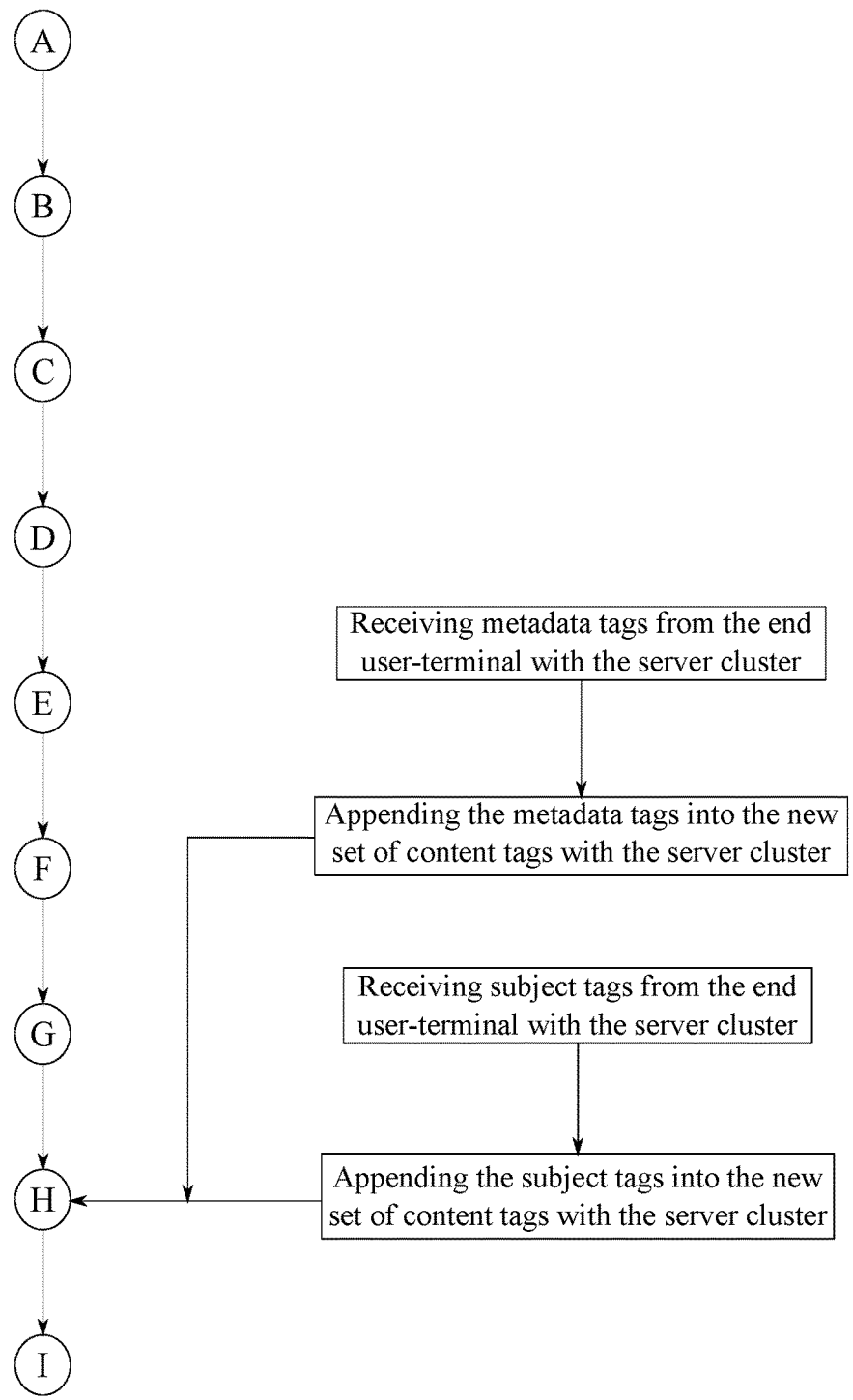
FIG. 4 is flow diagram detailing a user input for metadata tags and subject tags to append the new set of content tags.

More specifically to the preferred embodiment of the present invention, a content library is managed by the server cluster, shown in FIG. 2. The content library contains a database of standardized metadata tags. The pre-existing tags, the behavioral tags of the specific user profile, and the contextual tags are compared to the content-tag library with the server cluster in order to identify a set of verified metadata tags. Each verified metadata tag is then ranked amongst each other by executing a metadata-importance weighing algorithm. The metadata-importance weighing algorithm determines the significance for each of verified metadata tag in relation to each other to find the most relevant tags to the subject matter of the content from the pre-existing tags, the behavioral tags of the specific user profile, and the contextual tags to the content-tag library. A set of highest-ranked metadata tags from the set of verified metadata tags is then appended into the new set of content tags with the server cluster. Associating the highest-ranked metadata tags with the new set of content tags increase the effectiveness of the metadata tags to present relevant content to the user. More specific to the preferred embodiment of the present invention, at most five of the highest-ranked metadata tags from the set of highest-ranked metadata tags are appended to the new set of server tags to limit the amount of search iterations required to find relevant content. In an alternate embodiment of the present invention, the user is able to manually adjust the metadata tags for the new set of content tags, shown in FIG. 4. Metadata tags are received from the end-user terminal with the server cluster. The metadata tags are then appended into the new set of content tags with the server cluster.

Figure 3:
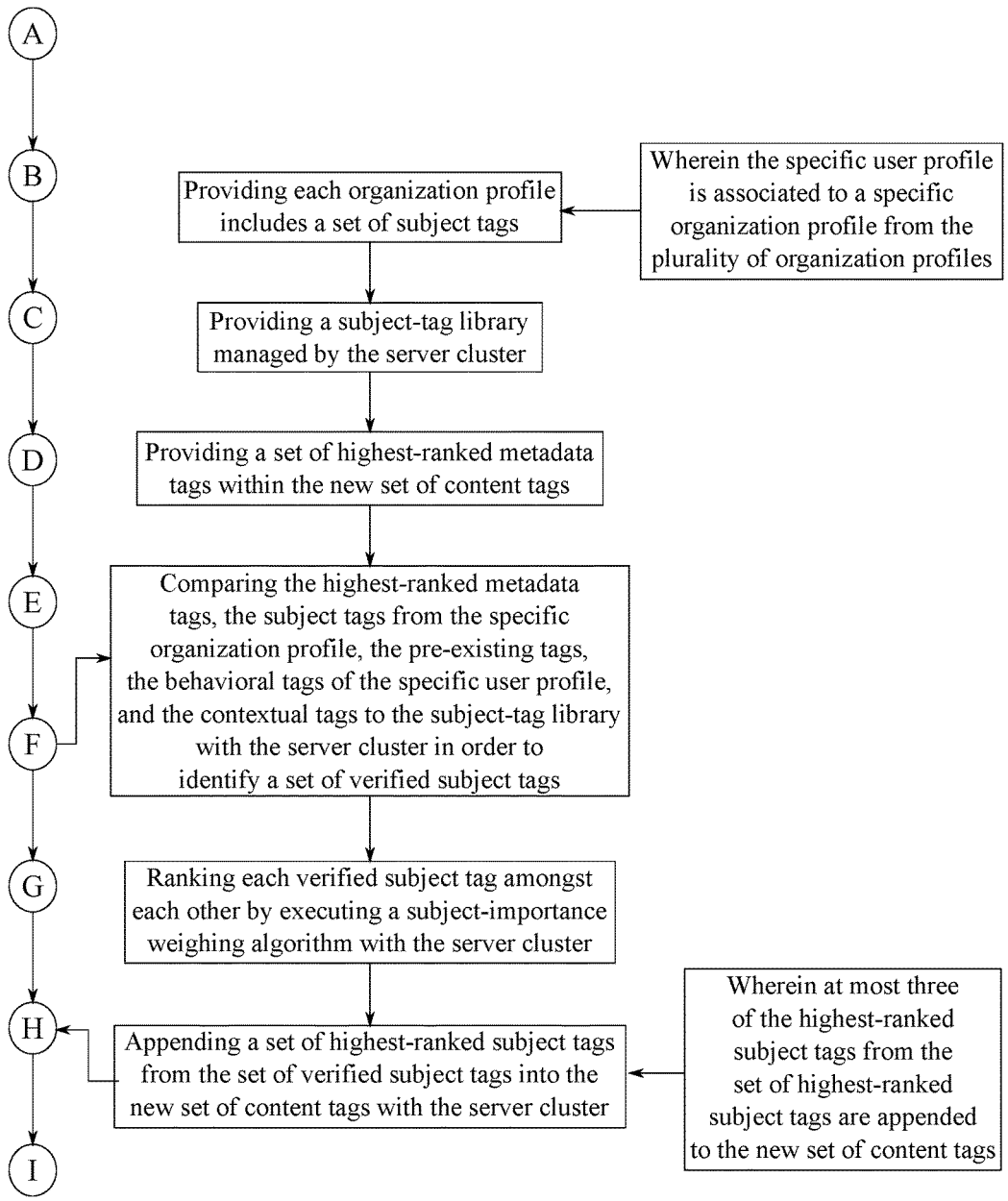
FIG. 3 is flow diagram detailing the generation of subject tags to append with the new set of content tags.

Further in accordance to the present invention, each organization profile includes a set of subject tags and a subject-tag library is managed by the server cluster, detailed in FIG. 3. Similar to the content library, the subject-tag library contains a plurality of standardized subject tags to further categorize the desired external content. The highest ranked metadata tags, the subject tags from a specific organization from the plurality of organization profiles, the pre-existing tags, the behavioral tags of the specific user profile, and the contextual tags are then compared to the subject-tag library with the server cluster in order to identify a set of verified subject tags, wherein the specific user profile is associated to the specific organization profile. Similar to the verified content tags, the verified subject tags increase the effectiveness of these content tags to present relevant content to the user. Each verified subject tag is ranked amongst each other by executing a subject-importance weighing algorithm. The subject-importance determines the significance for each of verified subject tag in relation to each other to find the most relevant tags to the subject tags from the specific organization, the subject matter of the content from the pre-existing tags, the behavioral tags of the specific user profile, and the contextual tags to the content-tag library. The highest-ranked subject tags allow for further categorization of the content. A set of highest-ranked subject tags from the set of verified subject tags is appended into the new set of content tags with the server cluster. Associating the highest-ranked subject tags with the new set of content tags increase the effectiveness of the subject tags to present relevant content to the user and allows the metadata tags and the subject tags to be placed in different tiers of an organizational hierarchy for ease of reference. More specific to the preferred embodiment of the present invention, at most three of the highest-ranked subject tags from the set of highest-ranked subject tags are appended to the new set of content tags to limit the iterations for comparing the tags for retrieval functions. In an alternate embodiment, the user is able to manually adjust the subject tags for the new set of content tags, shown in FIG. 4. Subject tags are received from the end-user terminal with the server cluster. The subject tags are then appended into the new set of content tags with the server cluster.

Figure 5:
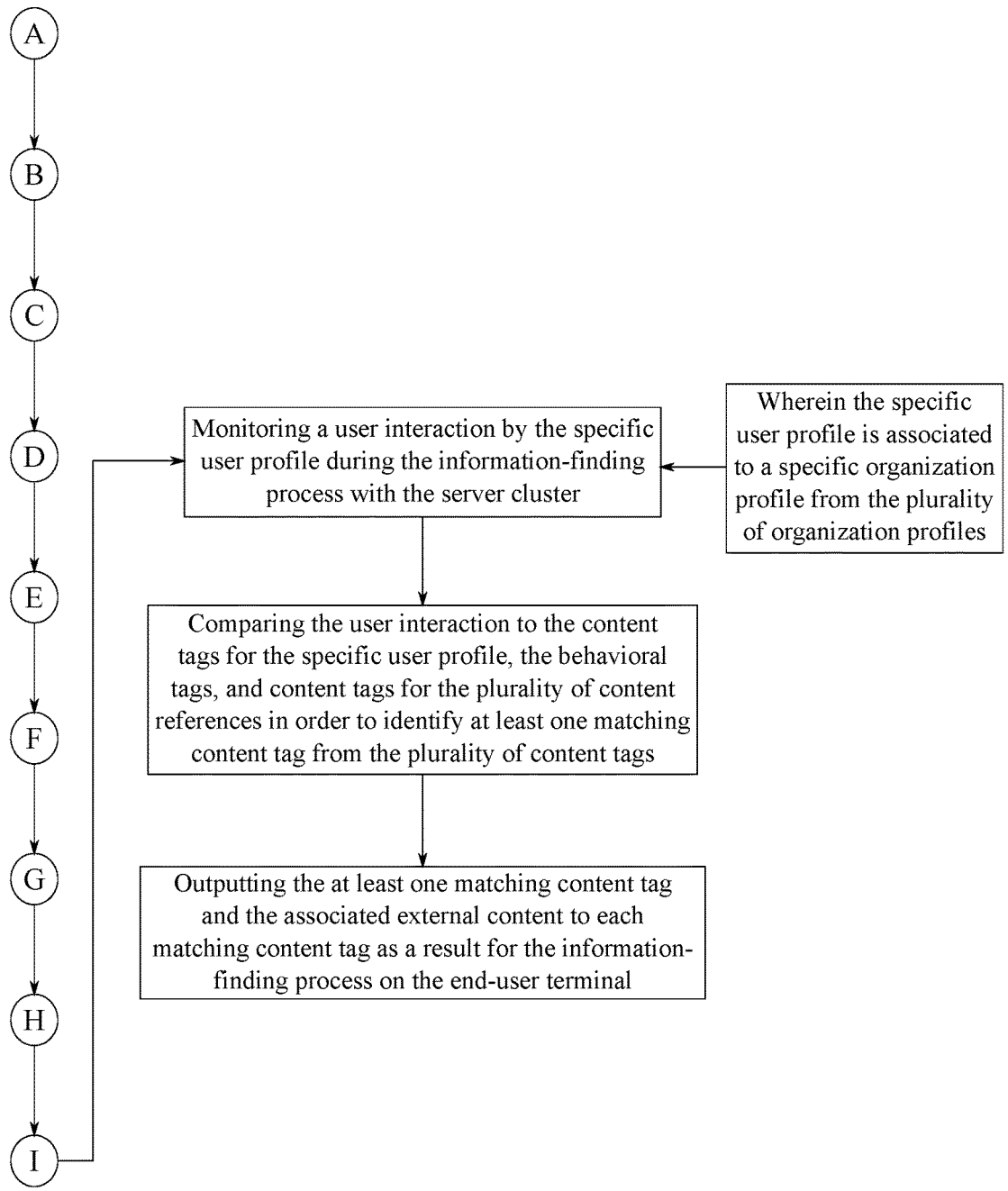
FIG. 5 is flow diagram detailing a process for outputting content that is based on user interactions as a recommendation for relevant content.
Figure 6:
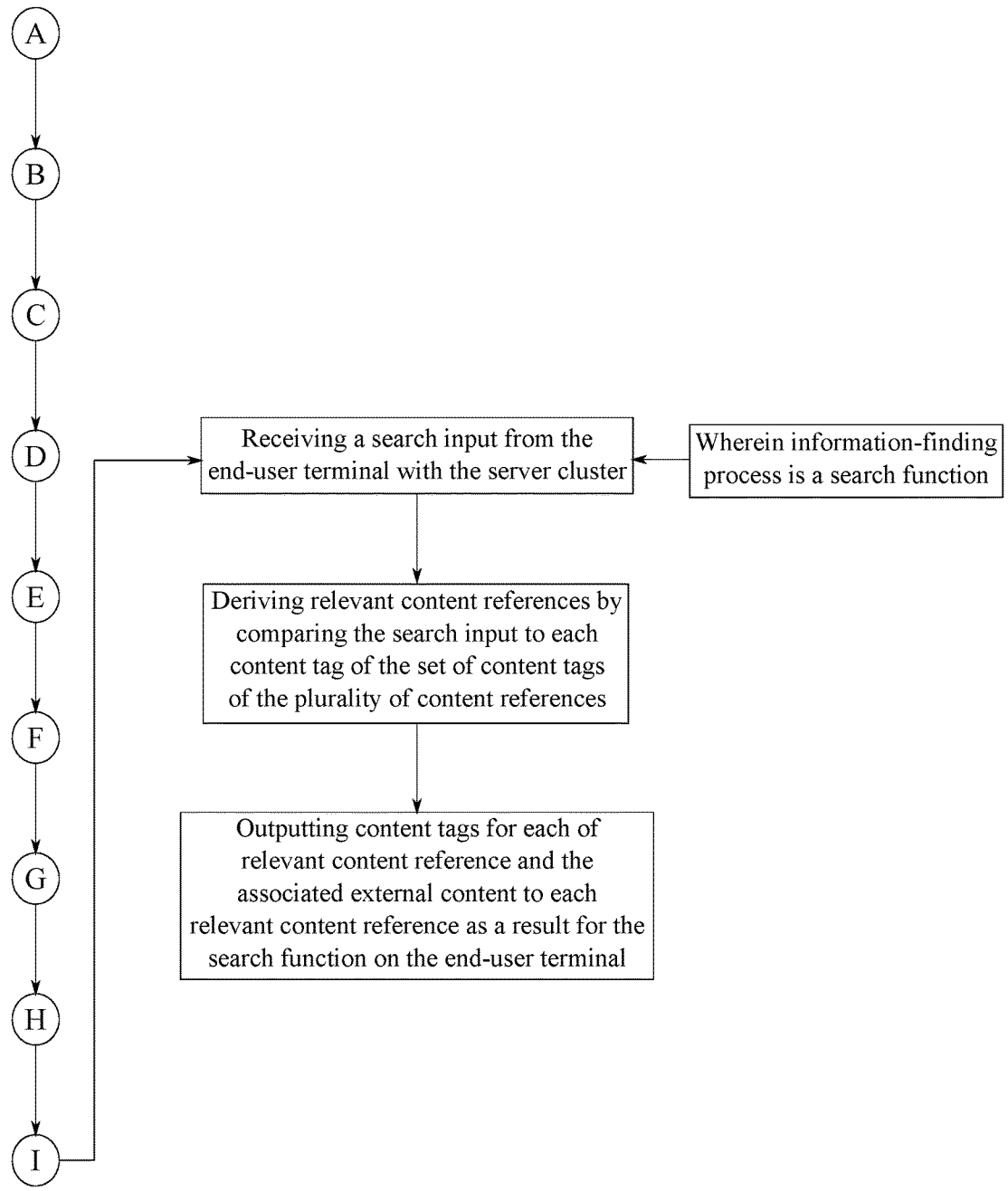
FIG. 6 is flow diagram detailing a process for outputting content with respect to a search input received with the server cluster.

Another object of the present invention is to provide content recommendations to the user based on their interaction history. A user interaction for the specific user profile is monitored during the information-finding process with the central server, in accordance to FIG. 5. The user interaction is then compared to the content tags for the specific user profile, the behavioral tags, and content tags for the plurality of content references in order to identify at least one matching content tag from the plurality of content tags. The matching tag is associated a reference for similar content to what the user has interacted, searched, and accessed with on the application. The at least one matching tag and the associated external content to each matching content tag is then output as a result of the information-finding process on the end-user terminal. Therefore, the present invention recommends and presents the external content to the user as the user interacts with the present invention.

Wherein the information-finding process is a search function, the present invention receives a search input from the end-user terminal with the server cluster, shown in FIG. 6. The search input is an input from the user to request desired external content to be located. Relevant content references are derived by comparing the search input to each content tag of the set of content tags of the plurality of content references. Content tags for each of relevant content reference and the associated external content to each relevant reference are output as a result for the search function on the end user terminal to display the desired external content to the user.

Exemplary Embodiment #1

The present invention is an online application that takes any type of information from any source, such as; website, document, video, LinkIn Profile, podcast, Google Doc, Evernote Note, etc and converts it into a standardized set of content tags called a "GemCard". By converting all these different types of information from all these different sources into a unified structure all the information becomes standardized and much easier to find later. The "GemCard" structure connects to our system's search, to all our information views and to all user accounts.

The GemCard structure also enables other powerful technologies to be built upon it, such as;
1) Gem Auto-tagging which takes the standardized structure and automatically generates three relevant tags based on a combination of the structure and the native content
2) Gem Auto-suggestion which uses the gem structure and user behavior to automatically suggest relevant content to the end user
3) Gem Auto-categorize which takes the standardized structure and automatically generates three relevant categories based on a combination of the structure, the auto tags and internet databases for the auto tags The present invention works by enabling the end user to grab any type of content from any application.

Types of content include; links, webpages, profiles, MS docs, MS excel, MS PowerPoint, photos, videos, audio files, web articles, Google Docs, Google Sheets, Google Presentation's, Evernote Notes, Salesforce Contacts, etc. Application sources include; Youtube, Vimeo, Google Apps, Facebook, gmail, Outlook, Dropbox, OneDrive, Box, Slack, Hubspot, MailChimp, Gainsight, Netsuite, etc.

The present invention then splits that information into two components;
1) Source content
2) GemCard When information comes into our system a GemCard is automatically created that sits on top of the content. This GemCard is converted into a GemPage where both the source content and newly created GemCard come together.

The present invention then makes the following aspects of the content searchable:
1) Source content—inside of documents, articles, etc
Filtered by content tags including, but not limited to:
1) Person who added the content
2) Date created
3) Place created
4) Type of content added
5) Source of content
6) Tags associated
7) Device from which it was added
8) Categories associated
9) Comments added
10) Description added
11) Folders associated
12) Groups associated
13) Images associated
14) File size
15) Badge Associated
16) File Type
17) Number of connections A user can also have content automatically suggested to them from across the system. The content included in the suggestion engine can be from any platform and in be any type of content All content also goes through a process of having tags and categories automatically assigned to it through the GemCard structure. On each GemCard there are fields for tags and categories. As the content is being processed our algorithm automatically, first, assigns three Tags. Second, the algorithm matches automatically generated Tags with Wikipedia pages and automatically categorizes the content in a hierarchical structure.

The most unique aspect of the present invention isn't the individual steps of transforming content into a metadata card but the fact that ALL content from ANY source is processed and standardized in a metadata Card.

Prior Art would be evernote's note creation process where all data converges into a note. This prior art doesn't segregate the metadata and the content which makes retrieval, autosuggestion and autotagging difficult and inaccurate.
Steps are as follows;
1a) Capture any type of content through Web Clipper
1b) Upload content from Desktop/File server through content importer
1c) Import content from other cloud storage platforms; Dropbox, Google Drive, Microsoft OneDrive, Evernote, Slack, gmail, Outlook, Facebook, Salesforce, etc
2) All content, no matter the type or the source, is automatically converted into a "GemCard". GemCard data includes; DublinCore metadata, Time, Date, Source, Username, Place, Type of Content, etc. This metadata is then pulled into a unique content structure for a set of content tags called a "GemCard" that are associated with the source content.

3) GemPage Creation: source content plus newly created GemCard metadata are combined into a Gempage. The Gempage displays both the original source content plus the GemCard.
4) GemPage search enhancement: the source content becomes searchable plus the newly created GemCard data is split into a faceted search where users can filter by all the created metadata fields.
5) Automatic Update of Gem Fields. As people use the system their activities, such as; clicks, searches, filters, editing of tags and commenting further enhances the GemCard onto of the content and automatically updates the GemPage. Users can also manually update a GemPage.
6) Autosuggestion of Content. Through user activity and automatic updating of gem metadata, the system has an algorithm that matches content in the system with users based on the preferences they demonstrated through activity in the system Essentially, the creation of the GemCard enables the creation of the GemPage, GemAutoTag, based upon an algorithm that ranks content from both the GemCard and the source content three tags are generated per each content source, and GemAutoCategory, based upon an algorithm that process the Tags generated plus GemCard plus Source Content and matches the results to internet databases. The GemCard is created upon content capture or upload. The GemCard merges with the source content to become the GemPage. User interaction with GemPages drives the GemAutoSuggest engine, based on user behavior on the system content is automatically suggested to each person based on their preferences.

Exemplary Embodiment #2

Figure 7:
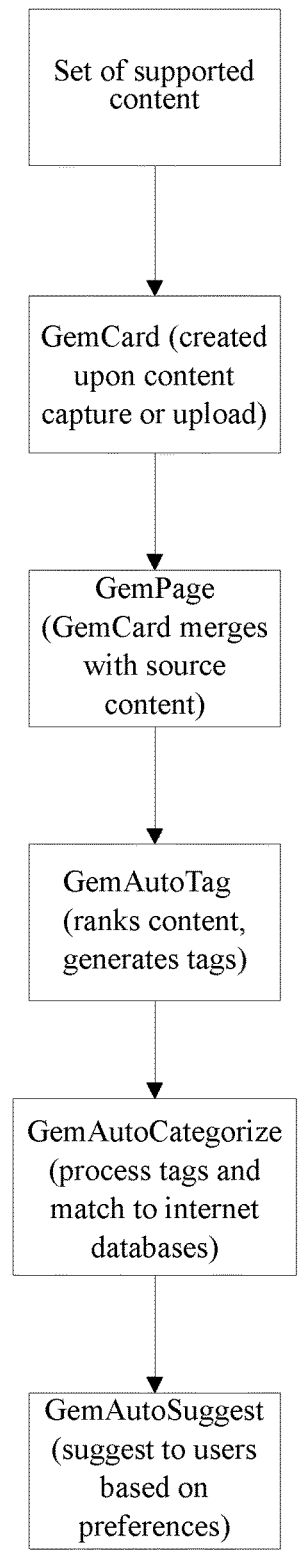
FIG. 7 is a general flow diagram for an exemplary embodiment of the present invention

In the present invention, a data standardization system for search optimization comprises of: a set of supported content types, a GemCard preliminary data set, a GemPage refined data set merged with source content, a Gem AutoTag tagging process, a Gem AutoCategorize categorization process, and a Gem AutoSuggest process automatically suggest content to users based on their preferences. FIG. 7 is a flowchart depiction of the interaction of the major components and processes of the present invention.

Figure 8:
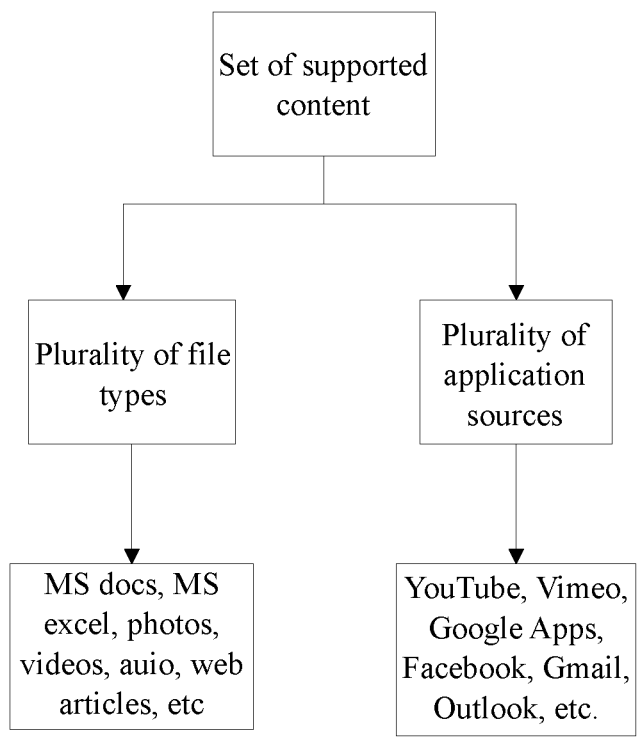
FIG. 8 is a flow diagram for the content supported by the exemplary embodiment of the present invention.

The first major component/process of the present invention is the set of supported content. The present invention's information system works by enabling the end user to grab any type of content from any application. This is depicted in FIG. 8.

In the invention's preferred embodiment, types of supported content include; links, webpages, profiles, MS docs, MS excel, MS PowerPoint, photos, videos, audio files, web articles, Google Docs, Google Sheets, Google Presentation's, Evernote Notes, Salesforce Contacts, etc.

Application sources include; YouTube, Vimeo, Google Apps, Facebook, Gmail, Outlook, Dropbox, OneDrive, Box, Slack, Hubspot, MailChimp, Gainsight, Netsuite, etc.

Notably, alternative or future embodiments of the invention may support content types and applications not explicitly listed here.

Figure 9:
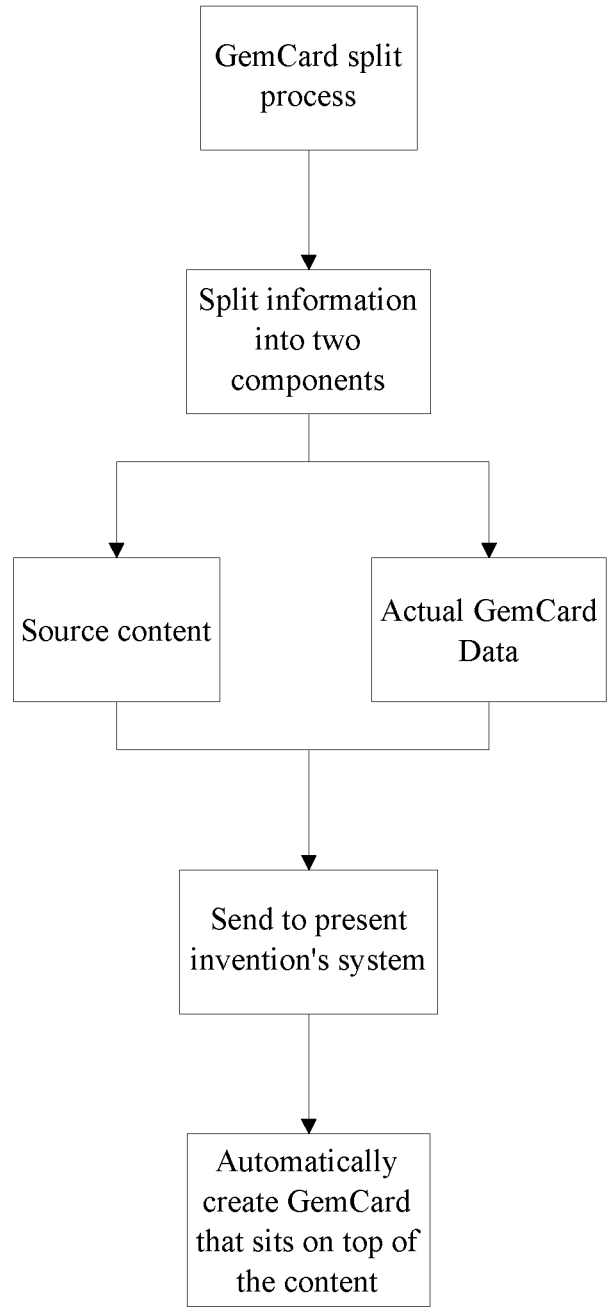
FIG. 9 is a flow diagram for the separation of tags with the source content

The next major component/process of the present invention is the GemCard. GemCards are the preliminary information data sets which are created upon content capture or upload. The present invention then splits that information into two components, the source content and the GemCard. When information comes into the present invention's system, a GemCard is automatically created that sits on top of the content. FIG. 9 is a flowchart depiction of the GemCard split process.

Figure 10:
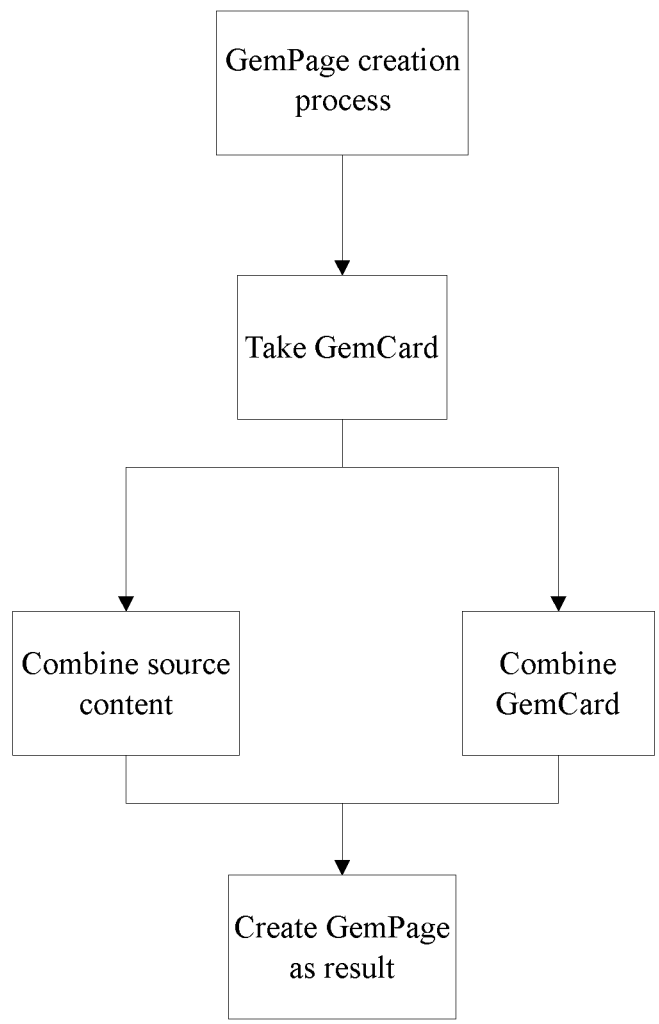
FIG. 10 is a flow diagram for the combination of source content and the set of content tags.

The next major component/process of the present invention is the GemPage. This component merges with the source content to become GemPage. A GemCard is converted into a GemPage where both the source content and newly created GemCard come together. FIG. 10 is a flowchart depiction of the GemPage creation process.

This GemPage then makes the following aspects of the content searchable. Again, the source content is defined as the internal contents of documents, articles, etc.

The GemPage allows filters by the following attributes. Person who added the content, Date created, Place created, Type of content added, Source of content, Tags associated, Device from which it was added, Categories associated, Comments added, Description added, Folders associated, Groups associated, Images associated, File size, Badge Associated, File Type, Number of connections.

Notably, alternative or future embodiment of the invention may support attributes not explicitly listed here.

The next major component/process of the present invention is the Gem AutoTag. This is based upon an algorithm that ranks content from both the GemCard and the source content. Three tags are generated per each piece of content.

The next major component/process of the present invention is the Gem AutoCategorize. This is based upon an algorithm that processes the Tags generated, plus GemCard plus Source Content and matches the results to Wikipedia pages. The hierarchy assigned to the Wikipedia pages is then attributed to the GemPage.

Herein follows a note on the interaction of the AutoTag and AutoCategorize process. All content also goes through a process of having tags and categories automatically assigned to it through the GemCard structure. On each GemCard there are fields for tags and categories. As the content is being processed, the present invention's algorithm automatically, first, assigns three Tags. Second, the algorithm matches automatically generated Tags with internet databases and automatically categorizes the content in a hierarchical structure.

The next major component/process of the present invention is the Gem AutoSuggest. This is based on user behavior. The system content is automatically suggested to users based on their preferences. A user can also have content automatically suggested to them from across the system. The content included in the suggestion engine can be from any platform and in be any type of content.

Figure 11:
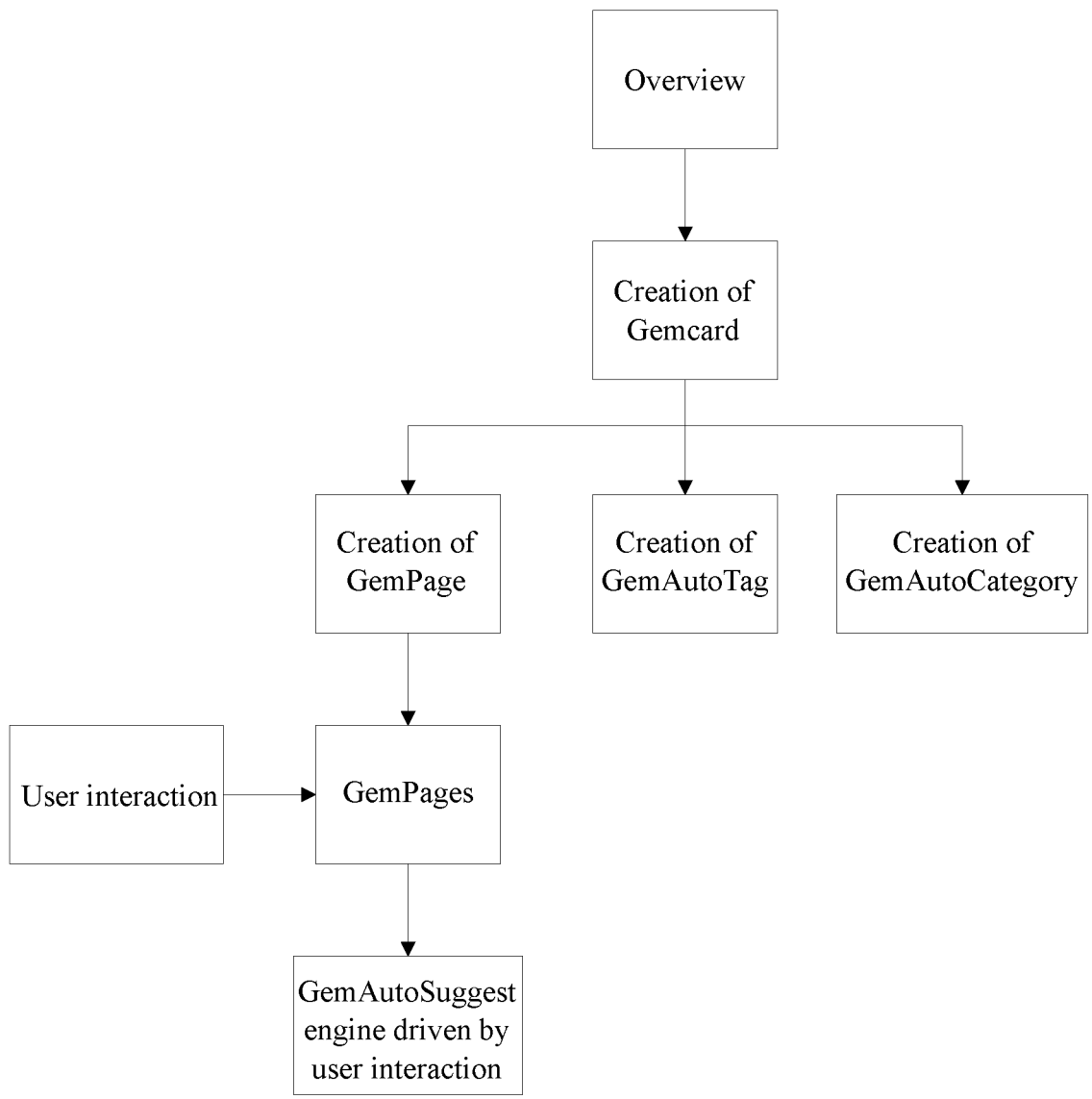
FIG. 11 is a flow diagram for an overview of the exemplary embodiment of the present invention.

Herein follows a summary of the major steps in the present invention and the interactions of the major components and processes. Essentially, the creation of the GemCard enables the creation of the GemPage, GemAutoTag and GemAutoCategory. User interaction with GemPages drives the GemAutoSuggest engine. This is depicted in FIG. 11.

The steps are as follows.

The present invention will capture any type of content through Web Clipper, or a similar service.

Next, the present invention will upload content from Desktop/File server through content importer.

Next, the present invention will import content from other cloud storage platforms; Dropbox, Google Drive, Microsoft OneDrive, Evernote, Slack, Gmail, Outlook, Facebook, Salesforce, etc.

All content, no matter the type or the source, is automatically converted into a "GemCard." GemCard data includes; DublinCore metadata, Time, Date, Source, Username, Place, Type of Content, etc. This metadata is then pulled into a unique content structure called a "GemCard" that sits on top of the source content.

Next is GemPage creation. Source content plus newly created GemCard metadata are combined into a Gempage. The Gempage displays both the original source content plus the GemCard.

Next is GemPage search enhancement. The source content becomes searchable plus the newly created GemCard data is split into a faceted search where users can filter by all the created metadata fields.

Next is Automatic Update of Gem Fields. As people use the system their activities, such as; clicks, searches, filters, editing of tags and commenting further enhances the GemCard of the content and automatically updates the GemPage. Users can also manually update a GemPage.

Lastly is Autosuggestion of Content. Through user activity and automatic updating of gem metadata, the system has an algorithm that matches content in the system with users based on the preferences they demonstrated through activity in the system Although the invention has been explained in relation to its preferred embodiment, it is to be understood that many other possible modifications and variations can be made without departing from the spirit and scope of the invention as hereinafter claimed.

What is claimed is:

1. A method for managing data from different sources into a unified searchable data structure comprising:
  performing an auto-tagging process, an auto-suggesting process and an auto-categorizing process by:
    (A) providing a plurality of organization profiles managed by a server cluster, wherein each organization profile includes a plurality of user profiles;
    (B) providing a plurality of content references managed by the server cluster, wherein each content reference includes a set of content tags;
    providing a content-tag library managed by the server cluster;
    (C) performing a process by continuously tracking user interactions for each user profile with the server cluster in order to assign a set of behavioral tags;
    (D) prompting each user profile to import a desired external content through an end-user terminal;
    (E) receiving the desired external content from the end user-terminal with the server cluster, wherein the desired external content includes a new content reference and a set of pre-existing tags and is associated to a specific user profile from the plurality of user profiles;
    (F) identifying a set of contextual tags for the desired external content with the server cluster;
    comparing the pre-existing tags, the behavioral tags of the specific user profile and the contextual tags to the content-tag library with the server cluster in order to identify a set of verified metadata tags;
    ranking each verified metadata tag amongst each other by executing a metadata-importance weighing algorithm with the server cluster;
    appending a set of highest-ranked metadata tags from the set of verified metadata tags into the new set of content tags with the server cluster, wherein at most five of the highest-ranked metadata tags from the set of the highest-ranked metadata tags are appended to the new set of content tags;
    (G) deriving a new set of content tags for the new content reference from the pre-exiting tags, the behavioral tags of the specific user profile and the contextual tags with the server cluster;

(H) appending the new content reference into the plurality of content references with the server cluster;

providing each organization profile includes a set of subject tags, wherein the specific user profile is associated to a specific organization profile from the plurality of organization profiles;

providing a subject-tag library managed by the server cluster;

providing a set of highest-ranked metadata tags within the new set of content tags;

comparing the highest-ranked metadata tags, the subject tags from the specific organization profile, the pre-existing tags, the behavioral tags of the specific user profile and the contextual tags to the subject-tag library with the server cluster in order to identify a set of verified subject tags;

ranking each verified subject tag amongst each other by executing a subject-importance weighing algorithm with the server cluster;

appending a set of highest-ranked subject tags from the set of verified subject tags into the new set of content tags with the server cluster, wherein at most three of the highest-ranked subject tags from the set of highest-ranked subject tags are appended to the new set of content tags; and (I) executing an information-finding process on the content references with the server cluster;

monitoring a user interaction by the specific user profile during the information-finding process with the server cluster;

comparing the user interaction to the content tags for the specific user profile, the behavioral tags and content tags for the plurality of content references in order to identify at least one matching content tag from the plurality of content tags; and outputting the at least one matching content tag and the associated external content to each matching content tag as a result for the information-finding process on the end-user terminal.

2. The method for managing data from different sources into a unified searchable data structure, as claimed in claim 1, comprising:

receiving metadata tags from the end user-terminal with the server cluster; and appending the metadata tags into the new set of content tags with the server cluster.

3. The method for managing data from different sources into a unified searchable data structure, as claimed in claim 1, comprising:

receiving subject tags from the end user-terminal with the server cluster; and appending the subject tags into the new set of content tags with the server cluster.

4. The method for managing data from different sources into a unified searchable data structure, as claimed in claim 1, comprising:

wherein the information-finding process is a search function;

receiving a search input from the end-user terminal with the server cluster;

deriving relevant content references by comparing the search input to each content tag of the set of content tags of the plurality of content references; and outputting content tags for each of relevant content reference and the associated external content to each relevant content reference as a result for the search function on the end-user terminal.

* * * * *